United States Patent Office 2,719,144
Patented Sept. 27, 1955

2,719,144

MODIFIED POLYACRYLONITRILES AND POLYMETHACRYLONITRILES

Newton H. Shearer, Jr., and Harry W. Coover, Jr., Kingsport, Tenn., assignors to Eastman Kodak Company, Rochester, N. Y., a corporation of New Jersey No Drawing. Application January 21, 1953,
Serial No. 332,536

12 Claims. (Cl. 260—88.7)

This invention relates to the preparation of modified polyacrylonitriles and to shaped articles prepared therefrom.

It is known that polyacrylonitrile can be spun into fibers having good physical properties, but poor dyeability. Various means have been employed to improve the affinity of polyacrylonitrile for commercial textile dyes. For example, improved dye affinity has resulted from interpolymerizing acrylonitrile with certain monomers whose polymers are known to be highly receptive to organic dyes. However, such interpolymers have a serious defect in that a substantial lowering of the softening point of the interpolymer generally occurs. Thus, A. E. Polson in U. S. Patent 2,579,451, dated December 18, 1951, shows that interpolymers of from 70 to 95 mole percent of acrylonitrile and from 30 to 5 mole percent of various acrylamides have softening points of from 140°–180° C., which is considerably lower than the softening point of either polyacrylonitrile or the various polyacrylamides. While these products give dyeable fibers and filaments which can be used for some textile purposes, a general application fiber having a substantially higher softening point would be very desirable. We have now made the discovery that when a relatively small portion of the nitrile groups in polyacrylonitrile or in polymethacrylonitrile are converted to N-substituted branched chain alkylamide groups, i. e. to groups represented by the structural group formula:

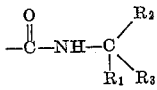

wherein $R_1$ represents a hydrogen atom and a methyl group and $R_2$ and $R_3$ represent an alkyl group containing from 1 to 2 carbon atoms (e. g. methyl or ethyl groups), the modified polyacrylonitriles so obtained not only have excellent affinities for commercial textile dyes, but more importantly such modified polyacrylonitriles have softening points above 200° C. so that fibers produced therefrom are especially suitable as general purpose textile materials.

It is, accordingly, an object of the invention to provide a new class of modified polyacrylonitriles and polymethacrylonitriles. Another object is to provide fibers and other shaped articles having high softening points. Another object is to provide a process for preparing such modified polymeric nitriles. Other objects will become apparent hereinafter.

In accordance with the invention, we prepare our modified polyacrylonitriles and polymethacrylonitriles comprising the recurring structural units

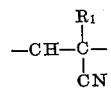

and

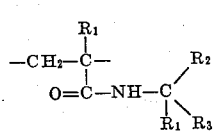

wherein $R_1$, $R_2$ and $R_3$ are as previously defined and wherein the acrylonitrile or methacrylonitrile groups constitute approximately from 60–85 percent by weight and the N-substituted acrylamide and methacrylamide groups constitute approximately from 40–15 percent by weight of the modified polymer, i. e. modified polyacrylonitriles and polymethacrylonitriles in which approximately from 10–20 percent of the nitrile groups are converted to the above defined N-substituted branched-alkylamide groups, by reacting polyacrylonitrile or polymethacrylonitrile with secondary or tertiary fatty alcohols; with esters of secondary or tertiary fatty alcohols; or with olefins, in the presence of an acid catalyst such as sulfuric acid, phosphoric acid, etc. Primary alcohols such as methanol, propanol, butanol, etc., are inoperative in our process. The time, temperature and concentration of reactants can be varied widely. However, it can be stated generally that the preferred temperature is from 15° to 70° C. The preferred time of reaction is from several minutes to several hours or more. The acid concentration can be varied advantageously from about 35–90 percent, based on the weight of the reaction mixture. The secondary or tertiary alcohol or esters thereof or the olefin can be employed in stoichiometric amount required to bring about the conversion in the stated range, but generally an excess is used, i. e. several or more times the weight of the starting polyacrylonitrile or polymethacrylonitrile, i. e. in the proportions of approximately from 1–5 moles to each mole of the polymeric nitrile compound. The excess can be recovered from the reaction mixture by conventional means such as set forth in Example 3. In any case, not less than 10 percent of the nitrile groups or more than 20 percent of the nitrile groups are converted to N-substituted branched chain alkylamides by the process of our invention. Mixtures of the above reactants (secondary or tertiary alcohols, etc.) can be employed to give mixed N-substituted amide products with the nitrile polymers. The process may be applied to polyacrylonitrile or polymethacrylonitrile in the form of solids, films, filaments, yarns or fabrics. Any high molecular weight resinous polyacrylonitrile or polymethacrylonitrile can be employed.

Suitable secondary or tertiary alcohols or esters thereof or olefins which can be used in the practice of our invention include alcohols containing from 3 to 5 carbon atoms such as isopropyl alcohol, secondary butyl alcohol, tertiary butyl alcohol, secondary amyl alcohol, tertiary amyl alcohol, esters of the above alcohols with saturated fatty acids containing from 2 to 4 carbon atoms such as isopropyl acetate, isopropyl propionate, isopropyl butyrate, secondary butyl acetate, secondary butyl propionate, tertiary butyl acetate, secondary amyl acetate, tertiary amyl acetate, etc., and monoolefins containing from 3 to 5 carbon atoms such as propylene, butylene, isobutylene, amylene and isoamylene.

The following examples will serve to illustrate further the modified polyacrylonitriles and polymethacrylonitriles of the invention, and the manner of their preparation.

Example 1

A patch of polyacrylonitrile fabric, one-inch square, was placed in a solution of 7.9 g. of isopropanol in 13.6 g. of 94 percent sulfuric acid. The solution was stirred and warmed to 50° C. and held at this temperature for a period of 3 minutes. The patch of cloth was removed, placed in cold water and washed thoroughly. This piece of cloth was found to be readily dyed with azo dyes such as, for example, 1-(6-methalsulfone-4-nitrophenyl-azo)-4-(N - β - hydroxyethyl - N - β - difluoroethyl) - aminobenzene. Nitrogen analysis indicated that approximately 10 percent of the nitrile groups in the polyacrylonitrile patch had been converted to N-isopropylamide groups. The product showed a softening above 200° C. and was soluble only in the usual polyacrylonitrile solvents such as dimethylformamide, dimethylacetamide and γ-butyrolactone.

Example 2

A one-inch square patch of polyacrylonitrile fabric was placed in a flask containing 50 cc. of isopropyl acetate and 32 g. of 94 percent sulfuric acid. This mixture was heated to reflux and stirred for 35 minutes at reflux. The patch was removed, placed in cold water and washed thoroughly. This piece was also readily dyed by azo dyes such as 1-(6-methylsulfone-4-nitrophenyl-azo)-4-(N-β-hydroxyethyl-N-β-difluoroethyl)-aminobenzene. Nitrogen analysis indicated that approximately 12 percent of the nitrile groups had been converted to N-isopropylamide [—CO—NH—CH(CH₃)₂] groups. The treated fabric had a softening point above 200° C. and was soluble only in polyacrylonitrile solvents such as dimethylformamide, dimethylacetamide, γ-butyrolactone, ethylene carbonate, etc.

Example 3

Polyacrylonitrile powder, 5.3 g. having a viscosity $\{\eta\}=2.45$, was added to 50 cc. of isopropyl acetate. With stirring, 32 g. of 94 percent sulfuric acid were added at 20°–30° C. After the addition was complete, the mixture was stirred and heated at 60°–65° C. for a period of 30 minutes. The mixture was poured onto ice, neutralized with sodium carbonate, filtered and washed with water. After drying in the air oven at 35° C. for 70 hours, the white polymer obtained weighed 5.5 g. Its viscosity was found to be $\{\eta\}=2.1$ in dimethylformamide. Nitrogen analysis showed approximately 24.0 percent by weight of nitrogen which value was equivalent to 17 percent conversion of nitrile groups in the polyacrylonitrile powder to N-isopropylamide groups. The polymer was spun from dimethyl formamide to give fibers having a softening point above 200° C. and other good physical properties. The fibers showed greatly improved dyeability over fibers from the original untreated polyacrylonitrile.

In place of the isopropyl acetate in the above example, there can be substituted a like amount of isopropyl propionate or isopropyl butyrate to give the same product wherein approximately from 10–20 percent of the nitrile groups of the polyacrylonitrile powder are converted to N-isopropylamide groups.

Example 4

5.3 g. of polyacrylonitrile powder were added to a solution of 32 g. of 94 percent sulfuric acid in 50 cc. of acetic acid. Then 50 cc. of tertiary butyl alcohol were added with stirring while maintaining the reaction mixture at 15°–20° C. The temperature was raised to 50° C. and maintained at this point for 30 minutes. The product was then isolated by the procedure of Example 3. Nitrogen analysis indicated that approximately 14 percent of the original nitrile groups had been converted to N-substituted tertiary butylamide [—CO—NH—C)(CH₃)₃] groups. The product had a softening point above 200° C. and was soluble only in the usual polyacrylonitrile solvents such as dimethylformamide, dimethylacetamide, etc.

In place of the tertiary butyl alcohol in the above example, there can be substituted a like amount of tertiary amyl alcohol to give a modified polyacrylonitrile product wherein approximately from 10–20 percent of the original nitrile groups have been converted to N-tertiary amylamide groups. Similarly, there can be substituted a like amount of secondary butyl alcohol in the above example to give a modified polyacrylonitrile in which approximately from 10–20 percent of the nitrile groups are converted to N-secondary butylamide groups.

Example 5

7.0 g. of polymethacrylonitrile powder were added to a solution of 50 g. of 94 percent sulfuric acid in 50 cc. of acetic acid. Propylene was admitted with stirring into the solution at 25° C. for a period of 10 minutes. The product was isolated by the procedure of Example 3. It was also soluble only in the usual polyacrylonitrile solvents and had a softening point above 200° C. Nitrogen analysis indicated that approximately 15 percent of the nitrile groups in the polyacrylonitrile starting material had been converted to N-isopropylamide groups.

All of the modified polyacrylonitriles and polymethacrylonitriles of the invention are soluble only in one or more of the usual polyacrylonitrile solvents such as dimethyl formamide, dimethyl acetamide, γ-butyrolactone, ethylene carbonate, N-methyl-2-pyrrolidone, malononitrile, ethylene cyanohydrin, dimethyl sulfone, dimethyl cyanamide, N,N-dimethyl methoxyacetamide, dimethyl sulfoxide, N-formyl pyrrolidone, tetramethylene sulfoxide, N-formylmorpholine, N,N'-tetramethylene methanephosphondiamide, and the like. Solutions or dopes of our modified polyacrylonitriles and methacrylonitriles in such solvents can be coated to continuous sheets, photographic film supports, foils, etc., or applied in some cases as impregnating agents to fibrous materials, but more especially can be spun by wet or dry spinning methods to fibers that are tough and flexible and characterized further by softening points substantially above 200° C. The solutions or dopes can advantageously have incorporated therein suitable plasticizers, fillers, coloring matter, and the like.

What we claim is:

1. A modified acrylic nitrile polymer selected from the group consisting of a polyacrylonitrile in which approximately from 10 to 20 percent of the nitrile groups are converted to —CO—NH—CRR₁R₂ groups and a polymethacrylonitrile in which approximately from 10 to 20 percent of the nitrile groups are converted to —CO—NH—CR₁R₂R₃ groups, wherein each R₁ represents a member selected from theg roup consisting of a hydrogen atom and a methyl group and each R₂ and R₃ represents an alkyl group containing from 1 to 2 carbon atoms.

2. A modified polyacrylonitrile in which approximately from 10 to 20 percent of the nitrile groups are converted to N-isopropylamide groups.

3. A modified polyacrylonitrile in which approximately from 10 to 20 percent of the nitrile groups are converted to N-tertiary butylamide groups.

4. A modified polymethacrylonitrile in which approximately from 10 to 20 percent of the nitrile groups are converted to N-isopropylamide groups.

5. A modified polyacrylonitrile in which approximately from 10 to 20 percent of the nitrile groups are converted to N-tertiary amylamide groups.

6. A modified polyacrylonitrile in which approximately from 10 to 20 percent of the nitrile groups are converted to N-secondary butylamide groups.

7. A process for preparing a modified acrylic nitrile polymer selected from the group consisting of a polyacrylonitrile in which approximately from 10 to 20 percent of the nitrile groups are converted to

—CO—NH—CR₁R₂R₃ groups and a polymethacrylonitrile in which approximately from 10 to 20 percent of the nitrile groups are converted to —CO—NH—CR₁R₂R₃ groups, wherein each R₁ represents a member selected from the group consisting of a hydrogen atom and a methyl group and each R₂ and R₃ represents an alkyl group containing from 1 to 2 carbon atoms, which comprises suspending an acrylic nitrile polymer selected from the group consisting of polyacrylonitrile and polymethacrylonitrile in a substantially anhydrous liquid comprising a strong mineral acid selected from the group consisting of concentrated sulphuric acid and concentrated phosphoric acid and an organic compound selected from the group consisting of a saturated monohydric aliphatic secondary alcohol containing from 3 to 5 carbon atoms, a saturated monohydric aliphatic tertiary alcohol containing from 4 to 5 carbon atoms, an ester of a saturated monocarboxylic fatty acid containing from 2 to 4 carbon atoms with the said secondary alcohol, an ester of a saturated monocarboxylic fatty acid containing from 2 to 4 carbon atoms with the said tertiary alcohol and a monoolefin containing from 3 to 5 carbon atoms, the said organic compound being present in amount of from 1 to 5 moles per mole of the said suspended polymer, and the said mineral acid constituting not more than 90 percent by weight of the reaction mixture, at a temperature of from 15° to 70° C., until from 10 to 20 percent of the nitrile groups of the said suspended polymer have been converted to amide groups, and separating the suspension of modified acrylic nitrile polymer from the reaction mixture.

8. A process for preparing a modified polyacrylonitrile in which approximately from 10 to 20 percent of the nitrile groups are converted to N-isopropylamide groups, which comprises suspending polyacrylonitrile in a substantially anhydrous liquid comprising concentrated sulfuric acid and isopropyl acetate, the said isopropyl acetate being present in amount of from 1 to 5 moles per mole of the suspended polyacrylonitrile and the said sulfuric acid constituting not more than 90 percent by weight of the reaction mixture, at a temperature of from 15° to 70° C., until from 10 to 20 percent of the nitrile groups of the suspended polyacrylonitrile have been converted to N-isopropylamide groups, and separating the suspension of modified polyacrylonitrile from the reaction mixture.

9. A process for preparing a modified polyacrylonitrile in which approximately from 10 to 20 percent of the nitrile groups are converted to N-tertiary butylamide groups, which comprises suspending polyacrylonitrile in a substantially anhydrous liquid comprising concentrated sulfuric acid and tertiary butyl alcohol, the said tertiary butyl alcohol being present in amount of from 1 to 5 moles per mole of the suspended polyacrylonitrile, and the said sulfuric acid constituting not more than 90 percent by weight of the reaction mixture, at a temperature of from 15° to 70° C., until from 10 to 20 percent of the nitrile groups of the suspended polyacrylonitrile have been converted to N-tertiary butylamide groups, and separating the suspension of modified polyacrylonitrile from the reaction mixture.

10. A process for preparing a modified polymethacrylonitrile in which approximately from 10 to 20 percent of the nitrile groups are converted to N-isopropylamide groups, which comprises suspending polymethacrylonitrile in a substantially anhydrous mixture of concentrated sulfuric acid and glacial acetic acid, the said sulfuric acid constituting not more than 90 percent by weight of the reaction mixture, passing propylene gas into the mixture in amount of from 1 to 5 moles per mole of the suspended polymethacrylonitrile, maintaining the reaction mixture at a temperature of from 15° to 70° C., until from 10 to 20 percent of the nitrile groups of the suspended polymethacrylonitrile have been converted to N-isopropylamide groups, and separating the suspension of modified polymethacrylonitrile from the reaction mixture.

11. A process for preparing a modified polyacrylonitrile in which approximately from 10 to 20 percent of the nitrile groups are converted to N-tertiary amylamide groups, which comprises suspending polyacrylonitrile in a substantially anhydrous liquid comprising concentrated sulfuric acid and tertiary amyl alcohol, the said tertiary amyl alcohol being present in amount of from 1 to 5 moles per mole of the suspended polyacrylonitrile and said sulfuric acid constituting not more than 90 percent by weight of the reaction mixture, at a temperature of from 15° to 70° C., until from 10 to 20 percent of the nitrile groups of the suspended polyacrylonitrile have been converted to N-tertiary amylamide groups, and separating the suspension of modified polyacrylonitrile from the reaction mixture.

12. A process for preparing a modified polyacrylonitrile in which approximately from 10 to 20 percent of the nitrile groups are converted to N-secondary butylamide groups, which comprises suspending polyacrylonitrile in a substantially anhydrous liquid comprising concentrated sulfuric acid and secondary butyl alcohol, the said secondary butyl alcohol being present in amount of from 1 to 5 moles per mole of the suspended polyacrylonitrile and the said sulfuric acid constituting not more than 90 percent by weight of the reaction mixture, at a temperature of from 15° to 70° C., until from 10 to 20 percent of the nitrile groups of the suspended polyacrylonitrile have been converted to N-secondary butylamide groups, and separating the suspension of modified polyacrylonitrile from the reaction mixture.

References Cited in the file of this patent

UNITED STATES PATENTS 1,984,417    Mark et al. _____ Dec. 18, 1934